May 3, 1960    J. MORKOSKI    2,934,883
TOOTH BAR MOUNTING FOR SIDE DELIVERY RAKES
Filed April 4, 1957    2 Sheets-Sheet 1

Inventor
James Morkoski
Paul O. Pippel
Attorney

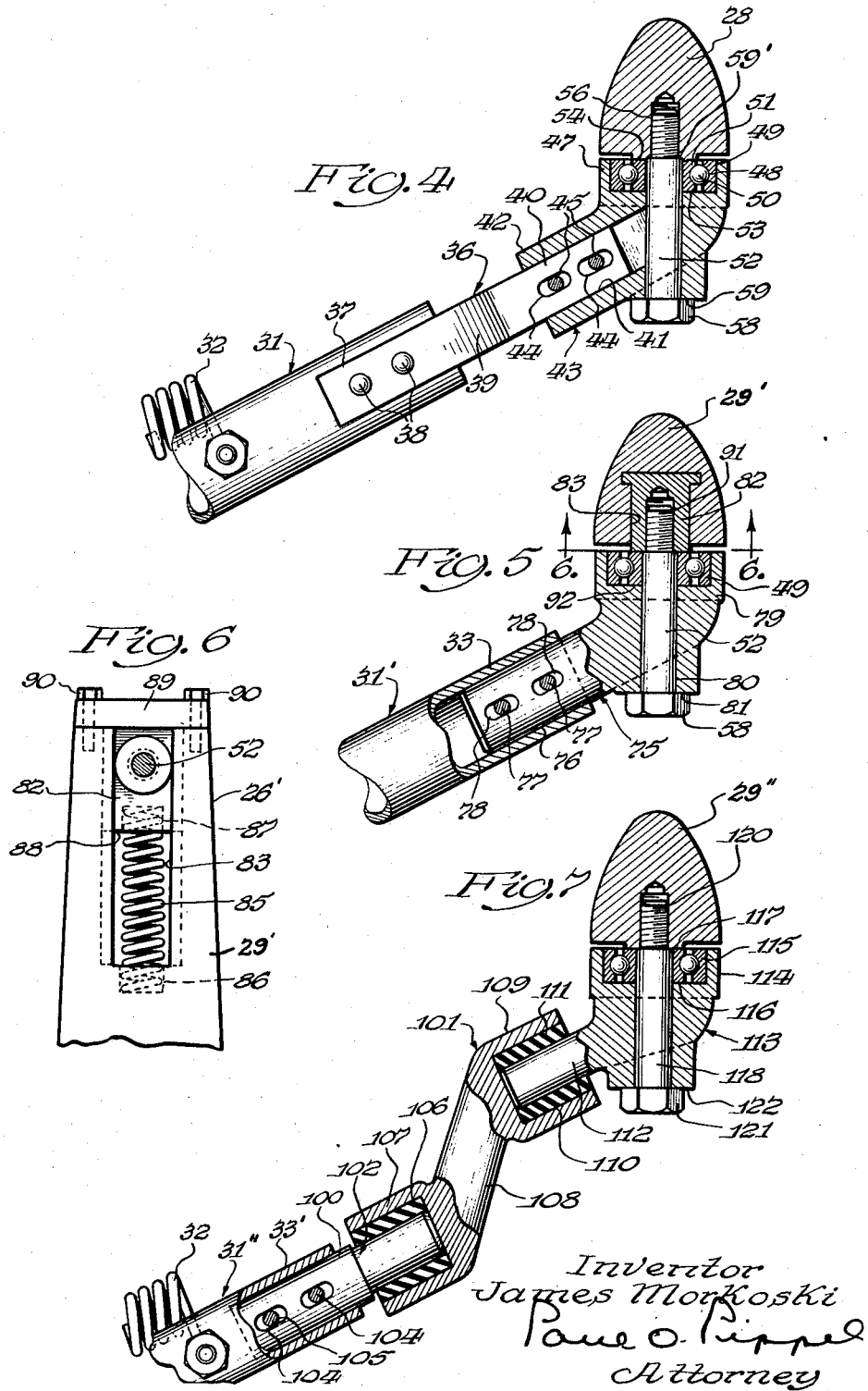

United States Patent Office 2,934,883
Patented May 3, 1960

2,934,883

TOOTH BAR MOUNTING FOR SIDE DELIVERY RAKES

James Morkoski, Des Plaines, Ill., assignor to International Harvester Company, Chicago, Ill., a corporation of New Jersey Application April 4, 1957, Serial No. 650,666

17 Claims. (Cl. 56—377)

This invention relates to side delivery rakes particularly of the type known as parallel bar side delivery rakes and more specifically to the mounting of the tooth bars.

A general object of the invention is to provide a novel tooth bar mounting in a parallel bar side delivery rake wherein the bar is bodily yieldable to clear obstructions and thus avoid damaging the teeth carried thereby.

A more specific object of the invention is to provide in a side delivery rake of the type in which the rake bars extend obliquely between a pair of supporting end members, a novel mounting for the rake bars from the end members wherein the connections compensate for misalignments and also afford yieldable support for the rake bars.

These and other objects of the invention will become more apparent from the specification and the drawings; wherein:

Figure 4 is a longitudinal sectional view on an enlarged scale taken substantially on the line 4—4 of Figure 2;

Figures 5 and 6 are enlarged views of a modified form of mounting, Figure 5 being comparable to Figure 4 and Figure 6 being a sectional view taken substantially on the line 6—6 of Figure 5;

Figure 7 is a further modification the view being essentially comparable to that of Figure 4.

Figure 1:
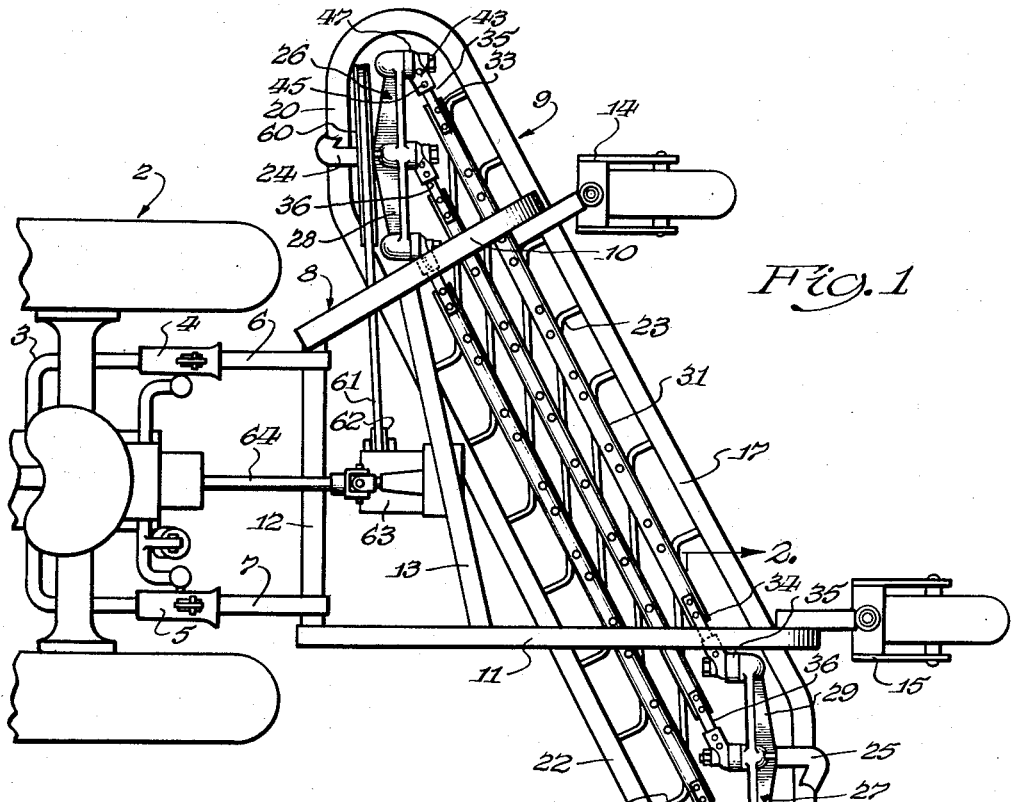
Figure 1 is a plan view of a side delivery rake incorporating the invention and a fragmentary view of the tractor to which the rake is connected.
Figure 2:
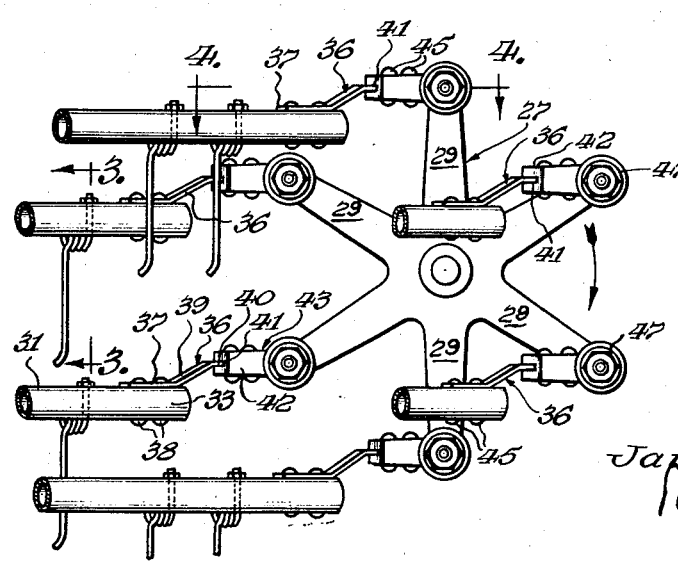
Figure 2 is a fargmentary perspective view on an enlarged scale of an end portion of the rake bar assembly.
Figure 3:
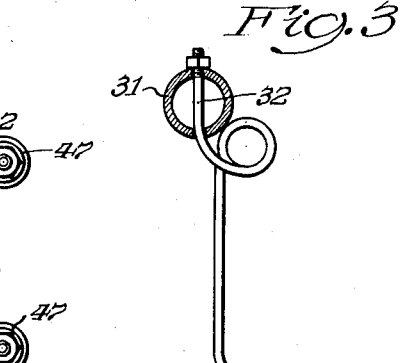
Figure 3 is an enlarged transverse sectional view of a rake bar taken substantially on the line 3—3 of Figure 2.

Describing the invention in detail and having particular reference to Figures 1–4 of the drawings, there is shown a tractor generally designated 2 which carries a hitch 3 of well-known type as shown and described in U.S. Patent 2,779,260 and which includes a pair of sockets 4 and 5 into which project the forwardly extending points 6 and 7 of the frame 8 of the side delivery rake 9.

The frame 8 of the rake 9 comprises a pair of fore and aft extending arch members 10 and 11 which at their forward ends are connected to cross beam members 12 and 13, member 12 being connected to the rear extremities of the forwardly extending points or draft connecting members 6 and 7. The frame 8 is carried at its rear end by caster wheel assemblies 14 and 15 in well-known manner which are attached to the rear extremities of the arch members 10 and 11 and to the rear transverse beam member 17 of the rhomboid shaped basket structure generally designated 18.

The basket 18 in addition to the rear beam member which is connected adjacent to its opposite ends, to the rear extremities of the arch members 10 and 11, comprises the forward and rear end beam members 20 and 21 which are integrated with opposite ends of the rear beam member 17 and at their forward extremities merge into opposite ends of the forward transverse beam member 22 which parallels generally the rear beam member 17 and with it supports a series of stripper bars 23.

The end beams 20 and 21 support spindles 24 and 25 which are located on generally horizontally substantially parallel axes and these members 24 and 25 support respectively the spiders or support end members 26 and 27 which in the present instance are illustrated as comprising a series of arms 28 and 29. It will be understood that these end members may be solid sheets of steel or metal castings or circular or polygonal members and that for purposes of the invention the specific configuration of these end members is not of particular importance.

There extend between corresponding arms 28, 29 of the end members rake bars 31 on each of which there are mounted a plurality of teeth 32 which depend therefrom and are adapted to interdigitate with the stripper bars 23 in a well-known manner.

Each end 33 and 34 of each bar 31 is yieldably supported from the related arm by means of substantially identical yieldable connection 35 and each connection in the embodiment shown in Figures 1 through 4 comprises a leaf spring member 36 which is somewhat Z-shaped in edge view and is disposed flatwise in a substantially horizontal plane and has its inner end portion 37 connected preferably as by rivets 38 to the related end of the bar 31. The resilient spring or strap 36 has a diagonally upwardly and outwardly extending intermediate portion 39 and from the upper outer end of the portion 39 extends an integral outwardly extending generally horizontal outer portion 40 which fits into a complementary socket 41 in the inner end 42 of a mounting or connector element 43. The portion 40 is closely confined within the complementary socket and is permitted relative movement lengthwise of the bar 31 by means of elongated slots 44 in the portion 40, the slots 44 receiving the rivets 45 therethrough which secure the strap 36 to the casting 43. The mounting element 43 terminates at its outer end in a bearing holder 47 within which is pressed the outer race 48 of bearing assembly 49, there being interposed the roller balls 50 between the outer race and an inner race 51, the inner race being sleeved over the spindle 52 and held tightly between opposed abutment surfaces on the inner side 53 of the socket 47 and the boss 54 formed on the related arm 28 or 29. The spindle 52 is positioned generally parallel to the spindle 24 and in the present instance is threaded as at 56 to the arm 28 and at its outer end comprises a head 58 which seats against the outer surface 59 of the member 43. The spindle shoulders at 59' on the boss 54 to prevent binding.

*Mode of operation*

In operation, as the front driving end member 26 is rotated by means of the pulley 60 connected thereto, the said pulley 60 being driven by belt 61 from a pulley 62 which is driven from a gear box 63 mounted on beam 13. The gear box receives power from the power take-off shafting 64 connected to the power take-off of the tractor. The power is transmitted from the member 26 through the rake bars 31 which in turn drive the driven or rear end member 27. It will be seen that the bars are inclined to the path of rotation of the end members and that the connections prevent rotation of the respective bars on their individual axes in view of the configuration of the leaf springs 36. However, any deviation from true parallelism between the spindles 24 and 25 is accommodated by the longitudinal sliding movement of the straps 36 with respect to the socket portions 43. It will also be seen that the disposition of the leaf springs is such that maximum resistance is developed against horizontal thrust which is developed as the rake bar is raking hay and the like. However, if there should be a stone or some other obstruction underneath the rake the rake bar passing over the obstruction will deflect upwardly with attendant deflection of the related springs inasmuch as the principal plane of its support and mounting springs is generally horizontal. Thus a novel, inexpensive and effective yieldable mounting is provided for the rake bar which is characterized by maximum resistance to deflection in a horizontal plane and minimum resistance to deflection in an upward or vertical plane.

Referring now to the embodiment shown in Figures 5 and 6, it will be observed that the same condition prevails in this embodiment as that previously described in that maximum deflection is obtainable in vertical planes as the bars are in raking position and no deflection or appreciably less deflection in horizontal planes. In the present embodiment parts identical with those in Figures 1–4 will be designated by corresponding reference numerals and it will be seen that there is provided in each end of each bar 31' a connecting element 75 which has a shank 76 slidably mounted in the end 33 for movement lengthwise of the bar 31' and retained therein with the lost-motion connection by means of the pins or rivets 77 which extend through elongated slots 78 in the shank portion 76. The outer end portion of the member 75 is formed as a bearing holder portion 79 within which is mounted the bearing 49 which is held in assembly by means of the spindle 52 which extends through the bore 80 in the portion 79 and has its head 58 in abutment as at 81 against the external side of the portion 79 and the inner end of the spindle is threaded into a guide block or sliding element 82 which is preferably T-shaped in cross-section and is slidable within a vertical T-shaped slot 83 in the related arm 29'. The radial slot 83 accommodates a compression spring 85 therein which at opposite ends is fitted into pockets 86 and 87 in the arm at the inner end of the slot 83 and in the inner face 88 of the block 82. The block is held within the slot in assembly with the arm 29' by means of a cap 89 which forms a closure for the outer end of the slot 83 and is secured to the arm by means of cap screws 90. It will be seen that the spindle 52 which is threaded as at 91 into the block and secures the bearing between the block and the inner face 92 of the cup portion 79 of the mounting member moves with the related tooth bar radially with respect to the associated arm or end member when the teeth engage in obstruction upon the bar being in its lowermost position. It will be observed that the spring is strong enough to resist normal loads which it encounters in raking and, furthermore, the in and out movement of the rake bar in this particular instance has a tendency to assist in stripping the hay off the fingers as the fingers emerge from the hay and retract into the stripper bars.

Referring now to the third embodiment of the invention, there is provided a tooth bar 31'' and the end 33' has fitted therein the shank portion 100 of the mounting or connector assembly 101 which in the present instance includes a stub shaft 102 which slidably fits within the end 33 and is retained therein and slidably connected thereto by means of the rivets 104 and the slots 105. The outer end of the shaft 102 extends into a rubber or resilient bushing 106 and is vulcanized thereto and the bushing fits within a socket 107 and is vulcanized perfectly thereto. The portion 107 forms one of the crank arms and is connected to the throw 108 which at its other end is connected to the other crank arm 109 which provides a socket 110 within which is vulcanized a resilient or rubber bushing 111. A shank 112 is socketed in bushing 111 and vulcanized thereto. The shank 112 merges into a bearing holder 113. The bearing holder essentially looks like the other two shown in Figures 4 and 5 and comprises the holder portion or the pocket 114 within which is fitted the bearing 115 which is retained between the inner surface 116 and the opposing boss 117 by means of a spindle 118 which is threaded as at 120 into the arm 29'' and at its outer end has its head 121 seated against the surface 122 on the embossment on the holder 113. It will be observed that the bushings or resilient members 106 and 111 are normally in a static or non-working position holding the bars in parallelism in the same sense as that shown in Figure 1. However, when the bar moves to its lowermost position and is raking hay and the like and if at that time it should strike an obstruction such as a big rock or the contour of the land should change abruptly then the bar is accommodated upward movement attendant to torsional deflection or shearing loading of the bushings 106 and 111. The orientation of the crank is such that the arms 107 and 109 are disposed in a substantially horizontal plane when the associated rake bar is in its lowermost position. Therefore there is extremely great resistance to the rake bar deflecting rearwardly and considerably less resistance to the rake bar rising, thus the bar performs an excellent raking operating. However, if it should strike an obstruction thereneath then it can rise and therefore protect the teeth.

It will be readily observed that a novel, efficient and simple tooth bar mounting has been developed which is illustrated in the three embodiments and that these connections not only accommodate deflection of the bars but also function to correct manufacturing tolerances and misalignments between the end members and the mounting of the bars on the end members.

What is claimed is:

1. A side delivery rake comprising a pair of rotatable end members having generally horizontal parallel axes of rotation laterally and axially displaced from one another, said end members disposed in substantially vertical planes, a plurality of rake bar members having connections at opposite ends with the respective end members effective to hold the bar members against rotation about their axes while moving bodily with the end members about the axes of the end members, the connection of each rake bar member with each end member comprising a spindle mounted in one of the members in general parallelism with the axis of the end member, and movement controlling means interposed between said spindle and the other of said members and operatively restricting movement of the rake bar member in a direction toward and away from said horizontal axes.

2. A side delivery rake comprising, in combination, a substantially vertically disposed end member having generally a horizontal axis of rotation, a generally horizontal rake bar member having a connection with said end member restraining said bar member against rotation about its own longitudinal axis and constraining it to move bodily in a closed path defined by rotation of said end member, the connection of said rake bar member with said end member comprising a spindle operatively connected to one of said members, and deflectible means including a resilient structure having substantial deflection interposed between said spindle and the other member, and means operatively associated with said structure and constraining it to deflect in a direction providing substantial movement for the rake bar member inwardly of the end member.

3. A side delivery rake comprising, in combination, a substantially vertically disposed end member having generally a horizontal axis of rotation, a generally horizontal bar member having a connection with said end member restraining said bar member against rotation about its own longitudinal axis and constraining it to move bodily in a closed path defined by rotation of said end member, the connection of said rake bar member with said end member comprising a spindle operatively connected to one of said members, and deflectible means including a resilient element interposed between said spindle and the other member, and means operatively associated with said resilient element and constraining it to deflect substantially radially of the end member, and said element comprising a leaf spring having its principal plane extending chordwise of the end member and disposed in longitudinal extension of the bar member.

4. The invention according to claim 2 and said element comprising a crank disposed in longitudinal extension of said bar member having a socket at each end and a resilient bushing in each socket, and mounting means on the bar member and spindle extending into the adjacent bushing, said bushings adapted to be stressed torsionally to accommodate said deflection.

5. The invention accordnig to claim 2 and said element comprising a compression spring extending radially of the end member and opposed abutment means on the spindle and said end member between which said spring is stressed, and means slidably mounting said spindle in the end member for movement generally radially relative to the latter.

6. In a side delivery rake comprising a rotatable end member having a generally horizontal axis of rotation, a rake bar member having a connection with the end member effective to hold the bar member against rotation about its axis while moving bodily with the end member about the axes of rotation thereof, said connection including resilient unidirectionally movable supporting means between the rake bar member and the end member for controlling the movement of the rake bar member in a direction toward and away with respect to the horizontal axis of rotation of the end member.

7. In a side delivery rake comprising a rotatable end member having a generally horizontal axis of rotation, a rake bar member having a connection with the end member effective to hold the bar member against rotation about its axis while moving bodily with the end member about the axis of rotation thereof, said connection including resilient means oriented to deflect principally approximately radially with respect to said end member, said end member disposed substantially vertically and further characterized in that said resilient means comprises a leaf spring extending lengthwise of said bar member.

8. In a side delivery rake comprising a rotatable end member having a generally horizontal axis of rotation, a rake bar member having a connection with the end member effective to hold the bar member against rotation about its axis while moving bodily with the end member about the axis of rotation thereof, said connection including resilient means oriented to deflect principally approximately radially with respect to said end member, said end member disposed substantially vertically and further characterized in that said resilient means comprises a leaf spring extending lengthwise of said bar member, and having a principal plane disposed chordwise of said end member.

9. In a side delivery rake comprising a rotatable end member having a generally horizontal axis of rotation, a rake bar member having a connection with the end member effective to hold the bar member against rotation about its axis while moving bodily with the end member about the axis of rotation thereof, said connection including resilient means oriented to deflect principally approximately radially with respect to said end member, said end member disposed substantially vertically and further characterized in that said resilient means comprises a leaf spring extending lengthwise of said bar member, and said leaf spring extending between said members and means mounting said spring for rotation on said end member on an axis parallel to the axis of rotation of the end member and spaced radially outwardly therefrom, and including a lost-motion connection means lengthwise of the rake bar member.

10. The invention according to claim 6 and said connection comprising a crank disposed between said members and having an arm adjacent to each thereof, and said resilient means comprising a bushing of resilient material torsionally stressed between each arm and the contiguous member.

11. The invention according to claim 6 and said connection including a block slidably mounted on the end member for movement radially thereof, and a compression spring interposed between said block and said end member urging said block radially outwardly of said end member, and means on said end member abuttable with said block for limiting outward movement thereof.

12. In a side delivery rake comprising parallel rotatable end members offset axially and laterally with respect to each other, and a plurality of rake bar members extending between said end members, and means mounting said bar members from the end members for substantial movement inwardly and outwardly of the end members and operatively connecting each end of each bar member to the adjacent end member and comprising spring means deflectible principally radially of said end members and having substantially no deflection otherwise, and said end members disposed approximately vertically.

13. In a side delivery rake comprising parallel rotatable end members offset axially and laterally with respect to each other, and a plurality of rake bar members extending between said end members, and means operatively connecting each end of each bar member to the adjacent end member and comprising spring means deflectible principally radially of said end members and having substantially no deflection otherwise, and said end members disposed approximately vertically, and said deflectible means comprising a leaf spring.

14. In a rake including a supporting frame, a rake reel journaled on the frame, and means for rotating said reel operatively associated therewith; the combination of a pair of spaced tooth bar carrying supports forming the ends of said reel and journaled for rotation on axially spaced and laterally offset generally parallel axes, circumferentially spaced tooth bars; the improvement comprising: means journalling said tooth bars at the peripheries of said supports at intervals about said axes to move bodily with rotation of said supports and remain in fixed predetermined angular relation to the ground and movably mounting said bars for movement generally radially of the supports and yieldable unidirectionally a substantial amount principally transaxially of the axis of rotation of the reel upwardly off the ground upon said tooth bars striking an obstruction thereon to cause the bar to clear the obstruction.

15. In a rake including a supporting frame, a raking reel journaled on the frame, and means for rotating said reel operatively associated therewith; the combination of a pair of spaced tooth bar carrying supports forming the ends of said reel and journaled for rotation on axially spaced and laterally offset generally parallel axes, circumferentially spaced tooth bars; the improvement comprising: means journalling said tooth bars at the peripheries of said supports at intervals about said axis to move bodily with rotation of said supports and remain in fixed predetermined angular relation to the ground and movably mounting said bars for movement generally radially of the supports and yieldable principally upwardly off the ground upon said tooth bars striking an obstruction thereon, and said means including a Z-shaped leaf spring having one end mounted to said bar and the other to said support and disposed flatwise substantially horizontally.

16. In a rake including a supporting frame, a raking reel journaled on the frame, and means for rotating said reel operatively associated therewith; the combination of a pair of spaced tooth bar carrying supports forming the ends of said reel and journalled for rotation on axially spaced and laterally offset generally parallel axes, circumferentially spaced tooth bars; the improvement comprising: means journalling said tooth bars at the peripheries of said supports at intervals about said axis to move bodily with rotation of said supports and remain in fixed predetermined angular relation to the ground and movably mounting said bars for movement generally radially of the supports and yieldable principally upwardly off the ground upon said tooth bars striking an obstruction thereon, and said means including a crank lying in a substantially horizontal plane and having a first arm yieldably and rotatably connected to the bar and a second arm yieldably and rotatably connected to the support.

17. In a rake including a supporting frame, a raking reel journalled on the frame, and means for rotating said reel operatively associated therewith; the combination of a pair of spaced tooth bar carrying supports forming the ends of said reel and journalled for rotation on axially spaced and laterally offset generally parallel axes, circumferentially spaced tooth bars; the improvement comprising: means journalling said tooth bars at the peripheries of said supports at intervals about said axis to move bodily with rotation of said supports and remain in fixed predetermined angular relation to the ground and movable mounting said bars for movement generally radially of the supports and yieldable principally upwardly off the ground upon said tooth bars striking an obstruction thereon, and said journal means including a member slidably mounted upon said support and guided for radial movement with respect thereto, and spring means reactively stressed between said support and said member for biasing the latter outwardly of the support.

References Cited in the file of this patent

UNITED STATES PATENTS

| | | |
|---|---|---|
| 2,621,465 | Klemm | Dec. 16, 1952 |
| 2,637,967 | McCandless et al. | May 12, 1953 |
| 2,639,574 | Richey | May 26, 1953 |
| 2,690,045 | Erickson et al. | Sept. 28, 1954 |
| 2,746,233 | McClellan et al. | May 22, 1956 |
| 2,750,729 | Skromme et al. | June 19, 1956 |
| 2,761,271 | Spicacci | Sept. 4, 1956 |
| 2,795,101 | Arend | June 11, 1957 |